United States Patent [19]

Broderick et al.

[11] Patent Number: 5,674,420
[45] Date of Patent: Oct. 7, 1997

[54] CLAMPING DEVICE FOR WELDING MACHINE

[75] Inventors: William P. Broderick, Delaware, Ohio; Stanley L. Ream, Farmington Hills, Mich.

[73] Assignee: Worthington Industries Incorporated, Columbus, Ohio

[21] Appl. No.: 489,495

[22] Filed: Jun. 12, 1995

[51] Int. Cl.[6] .................. B23K 11/02; B23K 11/36
[52] U.S. Cl. .................. 219/158; 269/20; 219/161
[58] Field of Search .................. 219/158, 161, 219/121.82, 101, 102, 103, 104; 269/37, 254 R, 20

[56] References Cited

U.S. PATENT DOCUMENTS

| | | |
|---|---|---|
| 2,740,877 | 4/1956 | Knauth et al. . |
| 2,922,870 | 1/1960 | Collins et al. . |
| 2,941,941 | 6/1960 | Knost .................. 269/20 |
| 3,032,639 | 5/1962 | Nesmith . |
| 3,122,118 | 2/1964 | Cooper .................. 219/158 |
| 3,275,794 | 9/1966 | Dubusker et al. . |
| 3,788,634 | 1/1974 | Chauvet et al. . |
| 3,816,696 | 6/1974 | Wheeler et al. .......... 219/161 |
| 3,938,797 | 2/1976 | Frederick . |
| 4,207,453 | 6/1980 | Astill . |
| 4,223,201 | 9/1980 | Peters et al. . |
| 4,461,946 | 7/1984 | Kratschmer . |
| 4,650,954 | 3/1987 | Frings et al. . |
| 4,847,467 | 7/1989 | Ausilio . |
| 4,879,448 | 11/1989 | Folger et al. . |
| 5,064,991 | 11/1991 | Alborante . |
| 5,142,118 | 8/1992 | Schlatter . |
| 5,221,585 | 6/1993 | Kresse, Jr. et al. . |
| 5,229,571 | 7/1993 | Neiheisel . |
| 5,245,156 | 9/1993 | Kamogawa et al. . |
| 5,250,783 | 10/1993 | Nishi et al. . |
| 5,266,770 | 11/1993 | Noe .................. 219/121.82 |
| 5,324,913 | 6/1994 | Oberg et al. . |
| 5,502,292 | 3/1996 | Pernicka et al. . |
| 5,536,915 | 7/1996 | Peru et al. .......... 219/121.82 |
| 5,591,358 | 1/1997 | Quagline . |

FOREIGN PATENT DOCUMENTS

| | | |
|---|---|---|
| 154929 | 1/1954 | Australia . |
| 246413 | 1/1963 | Australia .................. 219/161 |
| 44-5288 | 3/1996 | Japan .................. 219/161 |
| 893485 | 12/1981 | U.S.S.R. . |

*Primary Examiner*—Teresa J. Walberg
*Assistant Examiner*—J. Pelham
*Attorney, Agent, or Firm*—Fay, Sharpe, Beall, Fagan, Minnich & McKee

[57] ABSTRACT

A clamping device for butt welding metal sheets includes a base for supporting adjoining edges of a first and a second associated metal sheet. A first clamping unit is positioned above the base. The first clamping unit includes a plurality of first springs longitudinally spaced from each other. Each first spring has a first end, for selectively contacting the first associated metal sheet, and a second end as well as a first support linkage to which the second ends of each of the plurality of first springs are secured. The support linkage selectively applies the plurality of first springs to the associated first metal sheet. A second clamping unit is positioned above the base in a spaced manner from the first clamping unit. The second clamping unit includes a plurality of second springs longitudinally spaced from each other. Each second spring has a first end for selectively contacting the second associated metal sheet and a second end. The second ends of each of the second springs are secured to a second support linkage. The second support linkage selectively applies the plurality of second springs to the associated second metal sheet.

24 Claims, 7 Drawing Sheets

CLAMPING DEVICE FOR WELDING MACHINE

BACKGROUND OF THE INVENTION

This invention relates to a clamping device for a welding machine. More specifically, the present invention relates to a clamping device for joining sheets of material in abutting relation in order to allow a joining of the sheets to each other.

The present invention is particularly adapted for a clamping device used in a laser welding apparatus for butt welding metal sheets to each other. However, it will be appreciated by those of average skill in the art that the invention can be employed in other types of environments for joining—whether through welding or by other means—metal and non-metallic sheets to each other.

During any type of welding process, there are forces associated with thermal expansion and material solidification. These forces manifest themselves in plastic and elastic deformation of the material being welded adjoining the weld region. Additionally, this distortion may cause the abutting edges of material which has not yet been welded to move with respect to each other, with respect to the welding fixture and with respect to the welding apparatus. Any one of these changes in weld joint fit-up may cause an undesirable change in the welding process.

The control of weld joint fit-up is important to all welding processes. It is particularly important for welding processes which utilize a small joining source, such as a focused laser beam, an electron beam or constricted plasma. In these processes, virtually any change in fit-up or weld joint location can result in an unsuccessful weld. For example, the focused laser beam can simply pass through a fit-up gap as small as 0.010 inch (0.025 cm) without joining the abutting pieces. Therefore, it is essential that any gap in weld joint fit-up should be minimized, if not completely eliminated.

It is well known that during the butt welding of steel, there is a strong tendency for the weld joint to become gapped as the process progresses. While there is scientific dispute about the exact thermo-mechanical reasons for this tendency, it is nevertheless well known that these gapping forces can be overcome mechanically. Thus a variety of mechanisms have been developed for this purpose. Most of the known weld joint clamping mechanisms rely on high, static, clamping forces to resist the gapping tendency of the metal sheets. This "brute force" approach can be successful but it usually requires large, heavy and expensive mechanisms. Other known weld joint clamping mechanisms rely on sophisticated and expensive actuators and linkages which are intended to provide lateral forces to counteract the gapping forces. While both of these known approaches have been successful industrially, they are not the most economically effective.

Another challenge in the butt welding of sheet materials is the requirement that the weld joint be located accurately and repeatably with respect to the welding source (e.g. a focused laser beam). For this purpose, clamping mechanisms are typically equipped with some form of an edge locating device. The accuracy, repeatability and durability of such an edge locating device is critical to the success of the welding process. While it is desirable to provide this edge locating device exactly at the edge to be welded, the device must then be removed and protected during the actual welding operation. Considering the heat and weld spatter associated with this region of a welding system, it can be understood that the difficulty of providing accurate and repeatable weld joint positioning can be great.

Accordingly, it has been considered desirable to develop a new and improved clamping device for welding metal sheets which would overcome the foregoing difficulties and others while providing better and more advantageous overall results.

BRIEF SUMMARY OF THE INVENTION

In accordance with the present invention, a new and improved clamping device for butt welding material sheets is provided.

More particularly, in accordance with this aspect of the invention, the clamping device comprises a base for supporting adjoining edges of a first and a second associated sheet of material in a first clamping unit positioned above the base. The first clamping unit comprises a plurality of first springs longitudinally spaced from each other, each first spring having a first end, for selectively contacting the first associated sheet and a second end. The second ends of each of the plurality of first springs is secured to a first support linkage means for selectively applying the plurality of first springs to the associated first sheet. A second clamping unit is positioned above the base in a manner spaced from the first clamping unit. The second clamping unit comprises a plurality of second springs longitudinally spaced from each other, each second spring having a first end, for selectively contacting the second associated sheet and a second end. The second ends of each of the plurality of second springs is secured to a second linkage means for selectively applying the plurality of second springs to the associated second sheet.

If desired, a tip can be secured to the first ends of each of the plurality of first and second springs. Preferably, the plurality of first and second springs are so shaped that each of them can apply a combination downward and inward force to the associated first and second sheets. Preferably the base comprises a plurality of longitudinally spaced locating pins which, when in a raised position, are used for indexing an edge of the first associated sheet. Preferably the base further comprises a plurality of longitudinally spaced cylinders, the pins each being secured to a piston rod end of the respective cylinder. Preferably the base further comprises a shutter plate which selectively extends over a tip of each locating pin when the plurality of locating pins is in a lowered position. The shutter plate is desirably coupled to a shutter moving mechanism comprising a cylinder, to which one end of the shutter plate is secured, and a spring, to which another end of the shutter plate is secured.

If desired, the base can comprise a frame, a plurality of first longitudinally spaced metal bars secured to a first side of the frame for supporting the first associated sheet and a plurality of second longitudinally spaced metal bars secured to a second side of the frame for supporting the second associated sheet.

Preferably the first support linkage comprises a first member fixedly secured in relation to the base, a second member, spaced from the first member, to which the spring second ends are secured and a hinge located between the first and second members and secured thereto for pivotally mounting the second member to the first member. A first selectively pressurizable bag is located between the first and second members on one side of the hinge and a second selectively pressurizable bag is located between the first and second members on another side of the hinge. An inflation of the first bag causes the second member to pivot in relation to the first member to bring the first ends of the plurality of first springs into contact with the associated first sheet and an inflation of the second bag causes the second member to pivot in relation to the first member to space the first ends of the plurality of first springs away from the associated first sheet.

One advantage of the present invention is the provision of a new and improved clamping device used in the joining of sheets of material together.

Another advantage of the present invention is the provision of a clamping device having a plurality of resilient spring fingers for clamping a pair of associated sheets in a side by side relation so that the sheets can be successfully joined together.

Still another advantage of the present invention is the provision of a clamping device which is provided with a plurality of resilient fingers that apply a combination downward and inward force to a pair of sheets of material which they selectively clamp.

Yet another advantage of the present invention is the provision of a clamping device which is simple and quick to actuate by employing a linkage controlled by a pair of air bags. One bag is used to move the linkage and press a plurality of resilient fingers secured thereto down on a sheet. Another bag is used to retract the linkage and the resilient fingers from the sheet.

A further advantage of the present invention is the provision of a clamping device which includes a base having a plurality of selectively actuatable pins for indexing a first sheet in a proper location on the base.

A still further advantage of the present invention is the provision of a clamping device for a welding system in which a shutter can be selectively drawn over a plurality of indexing pins of the device in order to prevent any welding damage to the pins.

A yet further advantage of the present invention is the provision of a sheet clamping device which includes a support frame for holding air bags which move the clamping device and a frame clamp for engaging the support frame in order to insure that when the air bags are inflated and the sheets are clamped, the support frame will not be distorted.

Still other benefits and advantages of the present invention will become apparent to those of average skill in the art upon a reading and understanding of the following detailed specification.

BRIEF DESCRIPTION OF THE DRAWINGS

The invention may take physical form in certain parts and arrangements of parts a preferred embodiment of which will be described in detail in this specification and illustrated in the accompanying drawings which form a part hereof and wherein.

DESCRIPTION OF THE PREFERRED EMBODIMENT

Figure 1A:
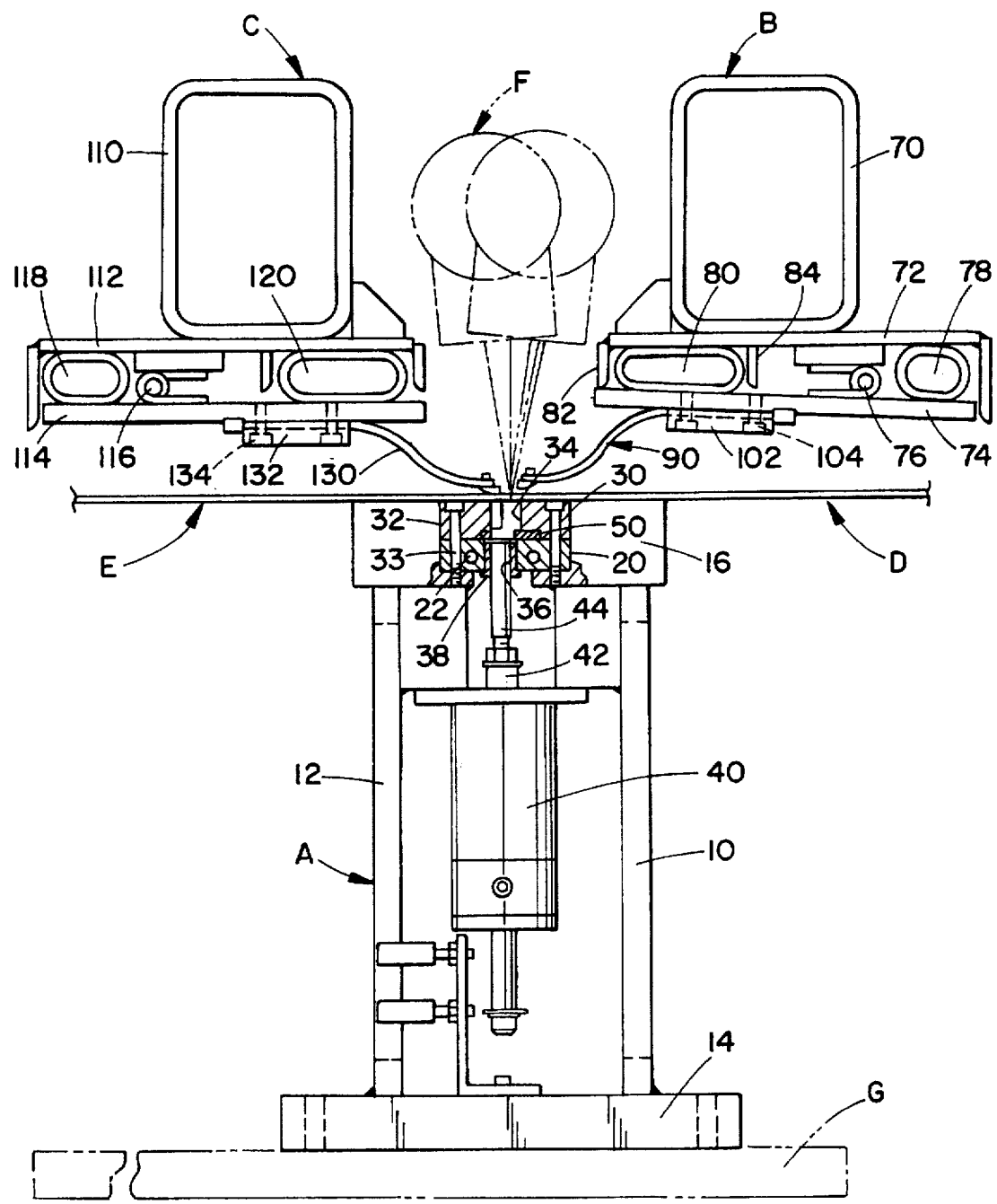
FIG. 1A is an end elevational view in cross-section of a clamping device for a welding machine according to the present invention.

Referring now to the drawings wherein the showings are for purposes of illustrating a preferred embodiment of the present invention only and not for purposes of limiting same, FIG. 1A illustrates a clamping device according to the present invention. The clamping device includes a base A, a first clamp unit B and a second clamp unit C. The two clamp units are employed to clamp a first material sheet D to a second material sheet E in an edge to edge relation so that the two material sheets can be butt welded with a suitable conventional welding tool F. While the welding tool discussed herein is a laser welder, it should be appreciated by those of average skill in the art that other types of welding tools and joining tools could also be employed if so desired. Also, while the sheets D, E are disclosed to be metal sheets, it should be appreciated that the sheets could be made of a suitable plastic material or a fiber reinforced composite or a ceramic material, if so desired.

The base A of the clamping device includes a first vertical leg 10 and a second vertical leg 12 spaced therefrom. The two legs are supported on and secured to a horizontal support plate 14. Secured to the first leg 10 and the second leg 12 is a rail 16. Defined in an upper surface of the rail is a somewhat U-shaped recess 18. Positioned in that recess is a longitudinally extending cooling plate 20 which rests on the rail 16. The cooling plate has in it a pair of cooling channels 22 which extend longitudinally and conduct a cooling fluid therethrough. Preferably the plate 20 is made from a suitable conventional non-corrosive metal, such as stainless steel.

Figure 6:
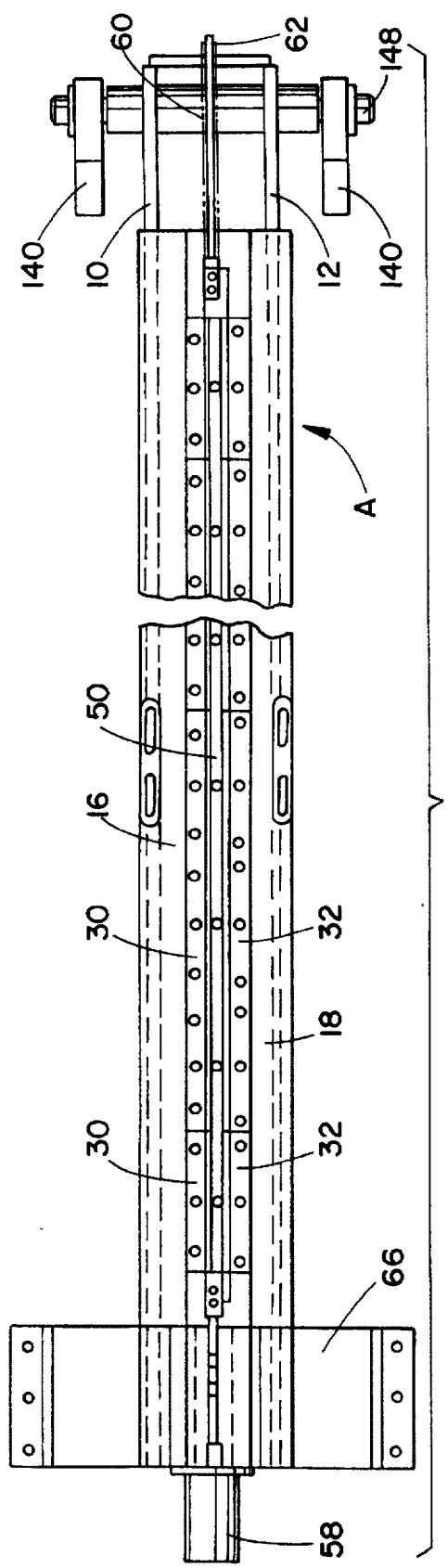
FIG. 6 is a top plan view, partially broken away, of a base sub-assembly of the device of FIG. 1.

Supported on the cooling plate 20 alongside a first side of the rail 16 is a first block 30 and supported adjacent a second side of the rail 16 is a second block 32. With reference now also to FIG. 6, it can be seen that a series of longitudinally spaced blocks 30 and 32, which may be of different sizes, are supported by the first and second rails 16 and 18. A plurality of such blocks 30 and 32 is provided so that if a block becomes degraded due to thermal stresses in the welding operation, that block can be replaced without having to replace the entire side of the base. Preferably the plurality of blocks 30 and 32 are made from a suitable conventional high heat transfer material, such as copper. A large number of short pieces is provided so that any one of them can be replaced if they are degraded by the laser welding tool F.

Figure 1B:
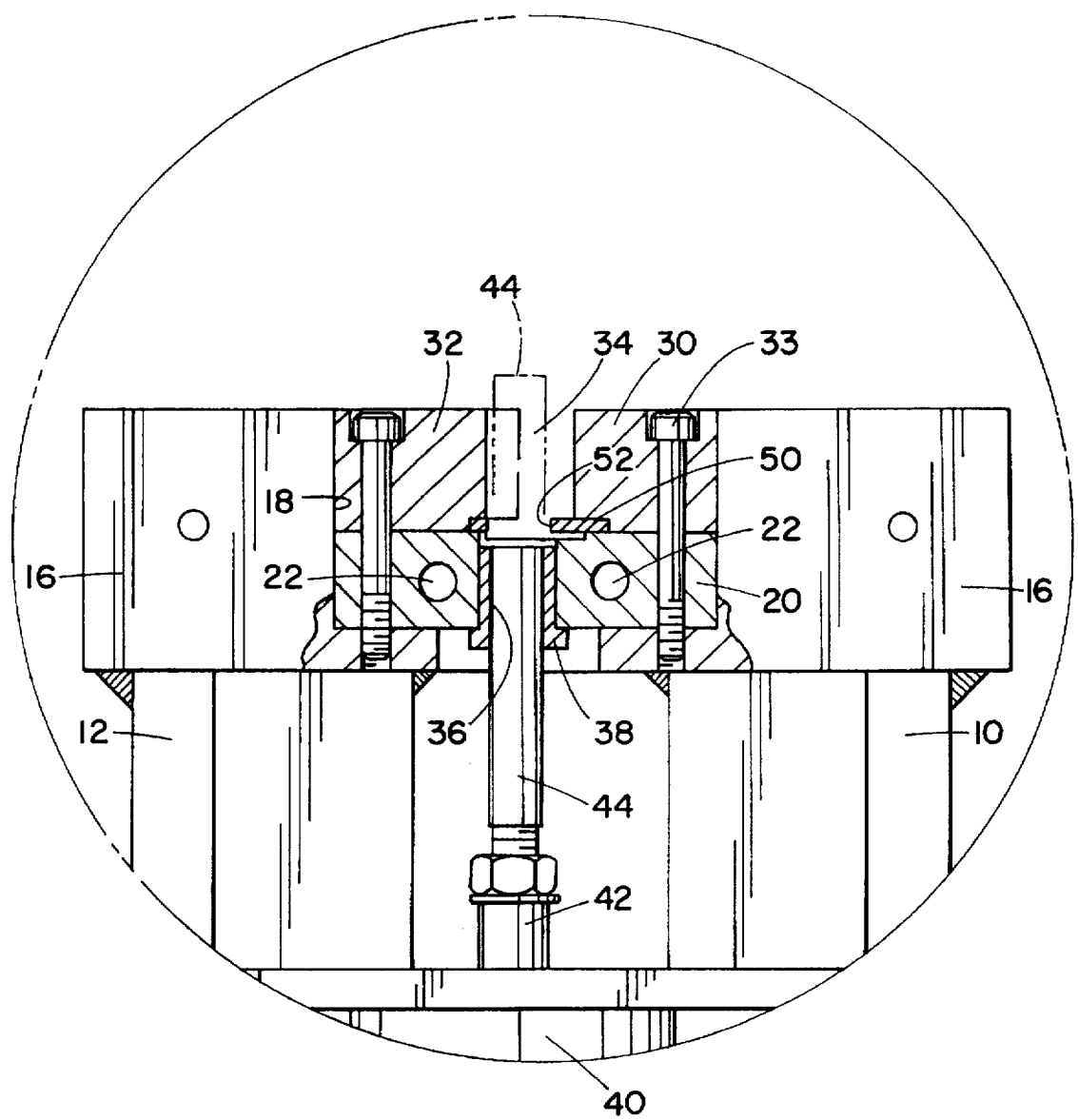
FIG. 1B is an enlarged end elevational view, partially in cross-section, of a portion of the clamping device of FIG. 1A.

As best shown in FIG. 1B, the first and second blocks 30 and 32 are secured, along with the cooling plate 20, to the first and second rails 16 and 18 by fasteners 3.

Figure 5:
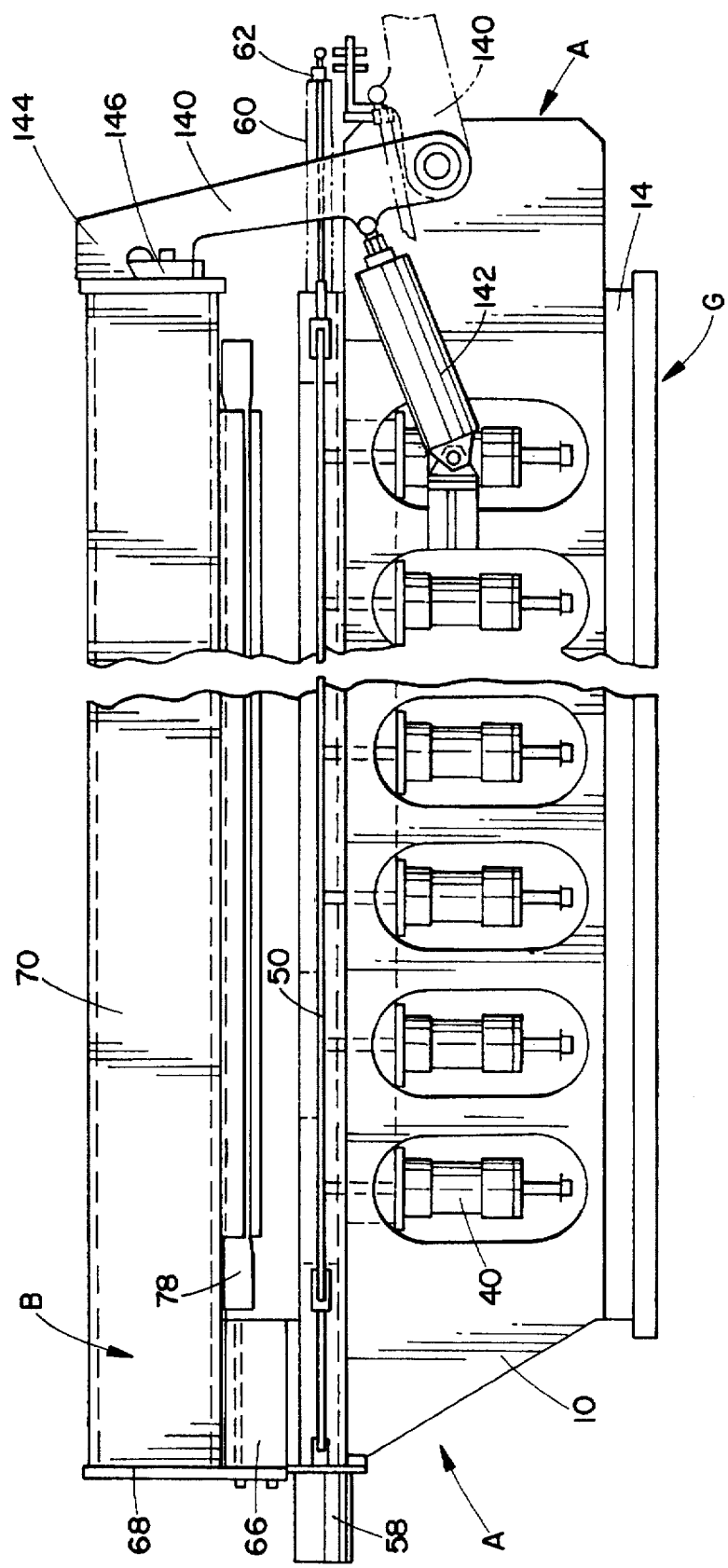
FIG. 5 is a side elevational view, partially broken away, of the device of FIG. 1.

With continued reference to FIG. 1B, the first and second blocks 30 and 32 define between them a gap 34. Positioned directly below the gap are a series of spaced bores 36 extending transversely through the cooling plate 20. Fitted in each of these bores is a sleeve 38. Positioned between the two vertically extending legs 10 and 12 and secured to the base A are a plurality of cylinders 40, as best illustrated in FIG. 5. Each of these cylinders includes a piston rod end 42 to which is suitably secured a pin 44. The pins extend through respective ones of the sleeves 38 into the gap 34. When the pins 44 are in an extended position, they extend above the plane of the top surface of the rail 16, as shown in dotted outline. In this position, the pins serve to index a leading edge of the first metal sheet D to make sure that it is in a correct location before the first clamp unit B is actuated to a clamping position.

Figure 7:
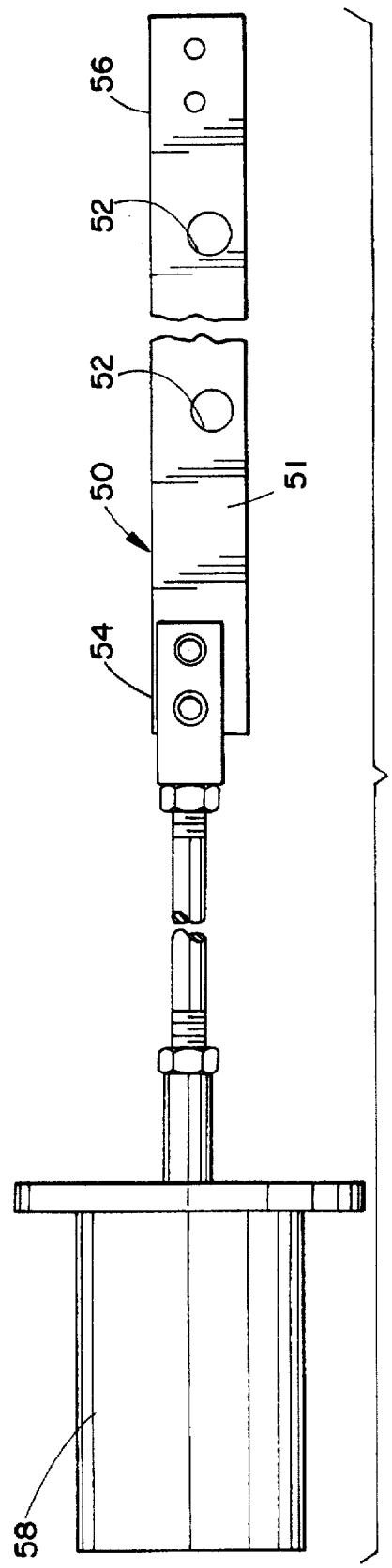
FIG. 7 is an enlarged top plan view, partially broken away, of a shutter sub-assembly of the device of FIG. 1; and, FIG. 8 is a schematic diagram of a pneumatic circuit of the device of FIG. 1.

When the pins 44 are retracted, they lie below the top surface of the cooling plate 20. Then, a shutter 50 can be employed. With reference now also to FIG. 7, the shutter 50 comprises an elongated strip 51 of a suitable conventional material, such as metal. The shutter includes a plurality of spaced apertures 52 extending therethrough. The series of spaced apertures 52 extends from adjacent a first end 54 of the shutter 50 to adjacent a second end 56 thereof. The apertures are so spaced and sized as to allow the pins 44 to extend therethrough when the shutter is correctly located. When the pins 44 are retracted, however, the shutter can be moved in order to cover the ends of the pins 44 to prevent any damage from the welding tool F to the pins. To this end, secured to the shutter first end 54 is a cylinder 58 and secured to the shutter second end 56 is a compression spring 60, shown schematically in FIGS. 5 and 6. Extending through the compression spring 60 is a threaded rod 62. The length of the rod 62 can be regulated in order to control the resilience of the spring 60 and hence the speed of movement of the shutter 50.

The reason for employing a shutter 50 to cover up the pins when the welding tool F is actuated, is to protect these pins from overheating and being degraded by the heat of the welding tool. Preferably the welding tool laser and the shutter 50 is positioned about one inch lower than the focal point of the laser and it should not be affected by the laser. However, if the effect of the laser does reach this far, it is preferable to have the shutter surface be degraded by any heat from the laser rather than to have the pins be degraded and have to be replaced because the shutter is more easily replaceable than is the plurality of pins. Preferable the shutter is made from cold rolled steel.

As is evident from FIGS. 1A and 5, the base A is supported on a conventional X-table G and is secured thereto.

With continued reference to FIG. 5, provided on a distal end of the base A is a support block 66. Secured to an end of the support block is a vertical plate 68. Positioned on and secured to the support block 66 and the support plate 68 is the first clamp unit B. With reference now again to FIG. 1A, the first clamp unit includes a first longitudinally extending beam 70 to which is secured, by conventional means, a longitudinally extending U-shaped first member 72. Positioned beneath the U-shaped member 72 is a longitudinally extending planar second member 74. A hinge 76 is located between the members 72 and 74 for hingedly securing the second member 74 to the first member 72.

A first selectively pressurizable bag 78 is located between the first and second members 72 and 74 on one side of the hinge 76. A second selectively pressurizable bag 80 is located between the first and second members on another side of the hinge. The second bag 80 is located between an inner wall 82 defining one leg of the first or U-shaped member 72 and a central wall 84 extending parallel to the first wall 82.

Figure 3A:
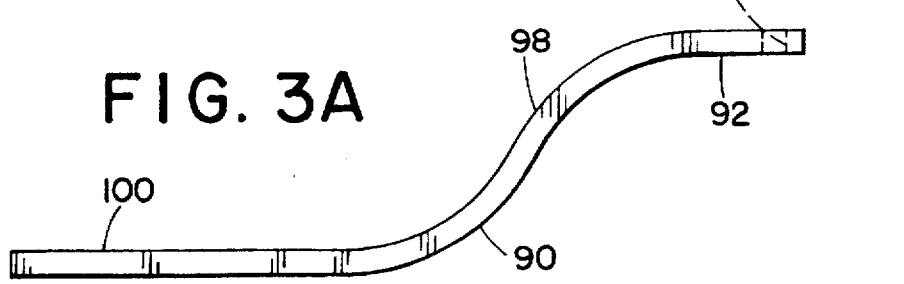
FIG. 3A is an enlarged side elevational view, in an upside down orientation, of a spring used in the device of FIG. 1.
Figure 3B:
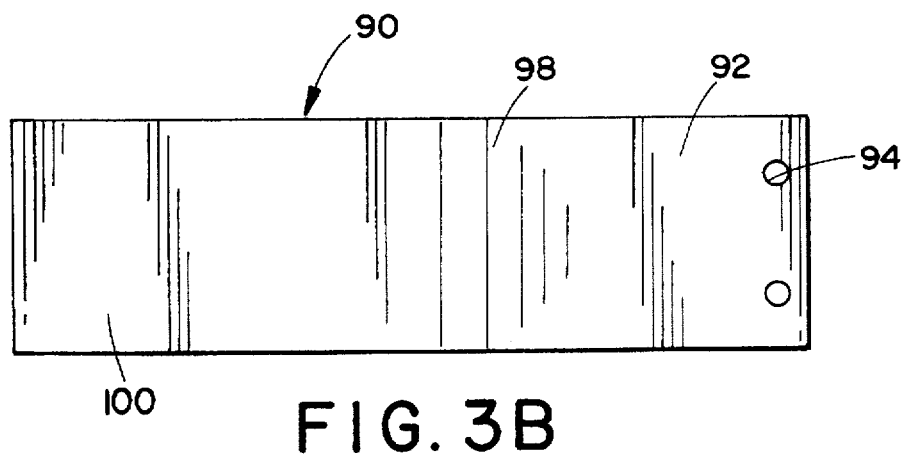
FIG. 3B is a top plan view of the spring of FIG. 3A.
Figure 4:
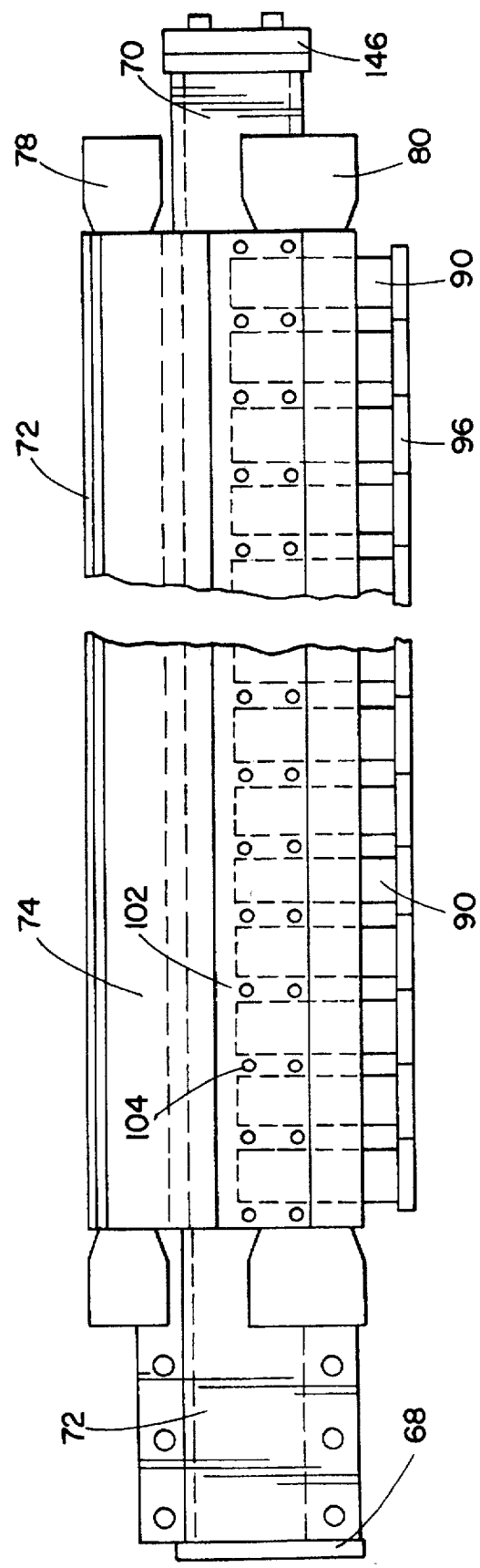
FIG. 4 is a bottom plan view, partially broken away, of a top sub-assembly of the device of FIG. 1.

Secured to the second planar member 74 are a plurality of spaced flat springs 90, as can best be seen in FIG. 4. With reference now also to FIG. 3A, each flat spring 90 includes a flat first end 92 through which extend a pair of spaced apertures 94, as is evident from FIG. 3B. A suitable bar of a non-scratching heat conducting material 96 (FIG. 2) can be secured to the spring 90 via suitable conventional fasteners extending through the pair of apertures 94. The spring 90 further comprises a bent central section 98 and a flat second end 100. With reference now again to FIG. 4, an elongated securing plate 102 is employed to fasten the second ends 100 of the plurality of springs 90 to the planar member 74. Suitable fasteners 104 are used for this purpose. In this way, a plurality of spaced individually movable springs 90 are secured along the length of the second member 74.

Figure 2:
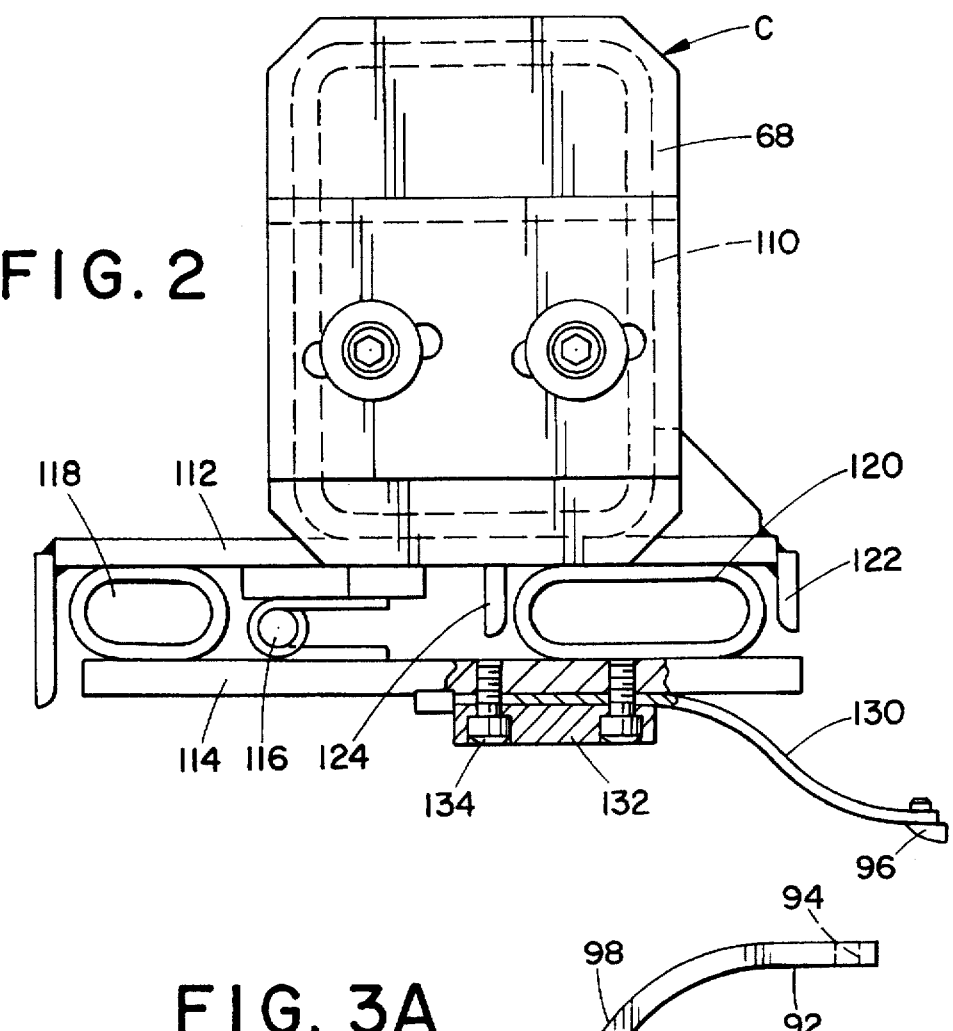
FIG. 2 is an enlarged end elevational view, partially in cross-section, of a portion of the device of FIG. 1.

With reference now also to FIG. 2, the second clamp unit C includes a second beam 110 to which is secured a U-shaped member 112. Positioned beneath the U-shaped member 112 is a second planar member 114. These two members are connected by a hinge 116. Positioned on a first side of the hinge 116 is a first air bag 118 and positioned on a second side of the hinge is a second air bag 120. The second air bag is positioned between an inner wall 122, which forms one of the legs of the U-shaped member 112, and a central wall 124 which extends parallel to the inner wall and is spaced therefrom. A second series of springs 130 is secured to the second planar member 114 via a securing plate 132 and a plurality of fasteners 134.

The plurality of separately flexing springs 90 and 130 is advantageous in order that one can simultaneously weld two different parts of two thicknesses, secured by one of the clamp units B and C on one side of the base A, to a common thickness metal piece on the other side of the base A, and secured by the other of the clamp units B and C. Preferably the springs 90 and 130 are made from a conventional spring steel so as to remain resilient and flexible.

It should be appreciated from FIG. 1A that the maximum pivoting movement of the second member 74 in relation to the first member 72 in an unclamping position is limited by the inner wall 82. Further, the maximum pivoting movement of the second member 74 in relation to the first member 72 into a clamping position is limited by the contact of the springs 90, more accurately of the bars 96, if such are employed, against the metal sheet D. The clamping position of the second clamp unit C is illustrated in FIG. 1A.

With reference now again to FIG. 5, a frame clamp 140 is pivotally secured to the base A. The clamp 140 is pivoted in relation to the base A via a clamp cylinder 142. The frame clamp 140 has on its free end a tooth 144 which engages over a plate 146 fixedly secured to the free end of the first beam 70. As is evident from FIG. 6, a pair of such frame clamps 140 are located, one on either side of the base A. Therefore, a similar clamp cylinder 142 is positioned on another side of the base A to operate the second frame clamp 140. The pair of frame clamps 140 are each pivotally mounted on a transverse pin 148.

The welding tool F is preferably a laser welding device of a conventional nature. Such devices can be obtained from, e.g., Trumpf, Inc. of Farmington, Connecticut or Rofin-Sinar, Inc. of Plymouth, Mich. and are preferably carbon dioxide lasers.

The shutter 50 can have a length of about 92 inches (234 cm.) whereas the blocks 30 and 32 can be about 8 inches (20.3 cm.) long.

The working length of the clamp unit can be approximately 7 feet (2.13 m.), or 84 inches (213 cm.) The maximum width of metal sheets which can be accommodated in the clamp fixture according to the present invention is 7 feet (2.13 m.), or 84 inches (213 cm.).

Figure 8:
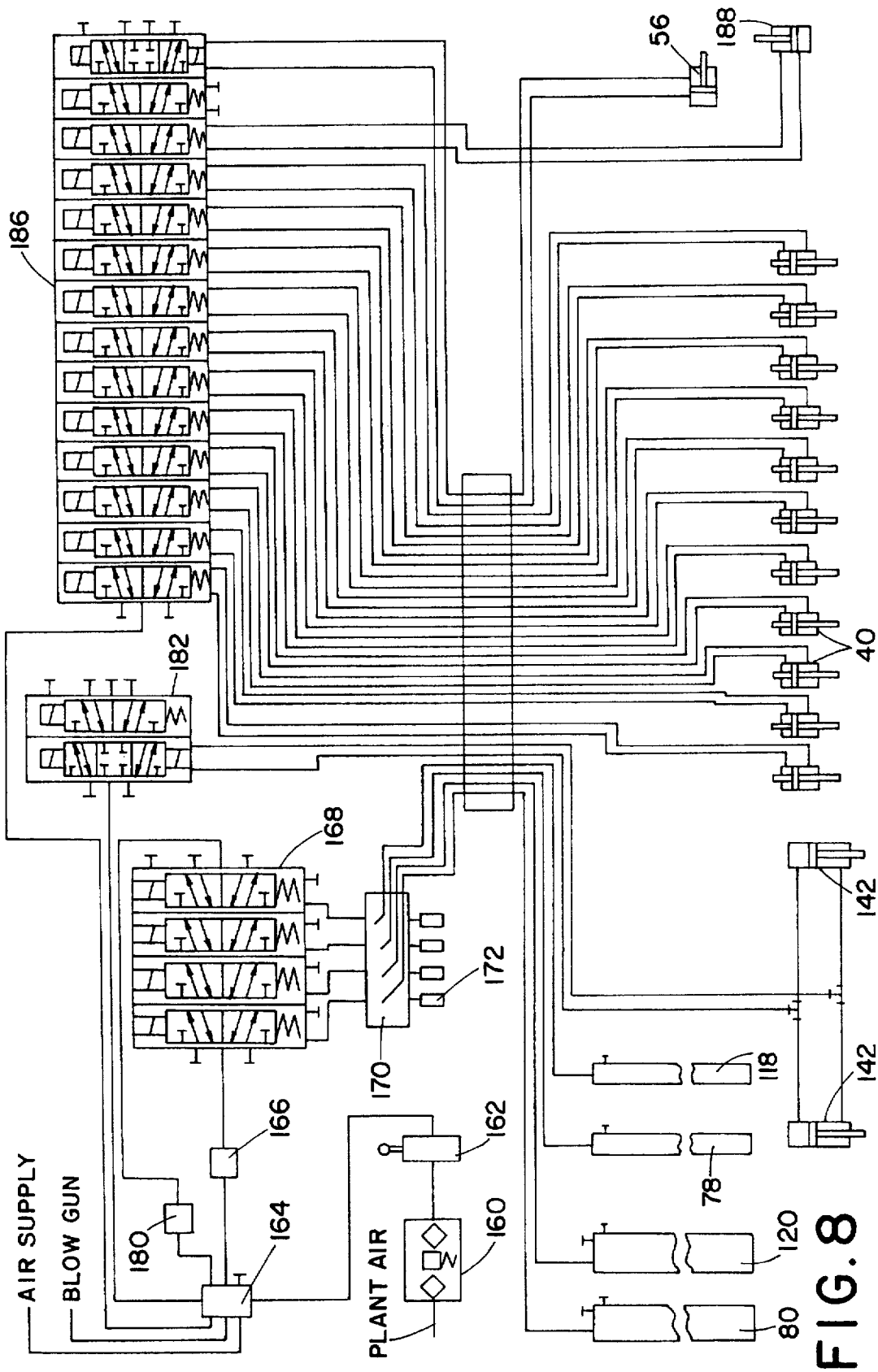

With reference now to FIG. 8, a pneumatic operating system for the clamping device includes a filter/regulator/lubricator device 160 which takes plant air or shop air and, after filtering it, regulating its pressure and lubricating it, feeds it into the pneumatic system. A lockout valve 162 is positioned downstream from the filter/regulator/lubricator device. Downstream from the lockout valve is a first manifold 164. This manifold feeds the air through a first line into a first regulator 166 and then into a four station manifold and valve assembly 168. Air, when so directed by the valves, can then flow through a second manifold 170 and to a respective one of the first, second, third and fourth bags 78, 80, 118 and 120 as regulated by the valving inside the four station manifold 168.

A pressure transducer 172 is associated with each fluid line extending through the second manifold 170. This pressure transducer transmits information concerning the pressure flowing through the line to a control unit (not illustrated).

A second line from the first manifold 164 leads to a second regulator 180 and then to a two station valve and manifold assembly 182. This manifold and valve assembly regulates the actuation of the pair of clamp cylinders 142. In addition, the first manifold 164 also directs air via a third line to a fourteen station manifold and valve assembly 186. The several valves in this manifold direct the operation of the plurality of cylinders 40 illustrated in FIG. 5, as well as the shutter actuation cylinder 56 also illustrated in FIG. 8.

The remaining cylinder 188 operated by one of the valves in the fourteen station manifold 186, controls an index pin located on a setup table positioned adjacent the second side of the clamping device. It is not illustrated in any of FIGS. 1–7.

It should be appreciated that in the preferred embodiment, there are eleven index pins 44 and cylinders 40 as is illustrated in FIG. 8. Similarly, there are eleven apertures 52 in the shutter 50. Obviously, however, any other suitable number of cylinder index pins and associated apertures could be provided depending on the length of the clamping device and the desired spacing of the pins.

All of the four station manifold 168, two station manifold 182 and fourteen station manifold 186 are conventional valve and manifold assemblies which are available from Numatics, Inc. of Highland, Mich. In addition, the first and second regulators 166 and 180 and the lockout valve 162 are similarly known components which are available from Numatics, Inc. The cylinders 40, 142 and 56 are also conventional and are available from a variety of sources such as The Parker Hannifin Company of Cleveland, Ohio.

Preferably the four air bags 78, 80, 118 and 120 are conventional and are available from, e.g. Merriman Products, Inc. of Jackson, Michigan under the name WIND-JAMMER™. Each of the air bags can have a length of 91 inches (231 cm.), if desired. Therefore, the air bags are somewhat longer than is the length of the plates 74 and 114. This can be seen from, e.g. FIGS. 4 and 5. The pneumatic connections for the bags are not illustrated in the drawings for the sake of simplicity.

As is evident from FIG. 8, the first manifold 164 also has additional outlets. A first outlet provides air supply to additional components and a second outlet is for a blow gun which can be used to clean out the gap 34 after a set number of welding operations has taken place.

The operation sequence of the clamping device will now be discussed. Assume that the X-table G is in the home position and the frame clamp cylinders 142 are closed so that the frame clamps 140 engage the first and second beams 70 and 110. Assume also that the unclamp air bags 78 and 118 are activated so that the two planar members 74 and 114 are so pivoted around their respective hinges 76 and 116 as to disengage the respective springs 90 and 130 from any adjacent metal sheets. Also, at this time, the shutter 50 is so located, by a cooperation of the cylinder 56 and the compression spring 60, that the respective guide pins 44 can extend through the shutter apertures 52. The guide pins 44 are in their extended position so that they protrude above the plane defined by the upper surface of the rail 16. Then a metal sheet D can be conveyed against the pins 44.

When this happens, the first side clamp air bag 80 is activated, allowing it to inflate, and the first side unclamp air bag 78 is deactivated, allowing it to deflate. Such inflation and deflation steps will cause the plate 74 to pivot on the hinge 76 and apply the springs 90 against the first sheet D, thereby clamping the sheet D on the base A. Once this has occurred, the cylinders 40 are actuated so as to retract the pins 44 back into the sleeves 38 in the cooling plate 20. Thereafter, the cylinder 56 is actuated so as to slide the shutter 50 over the tops of the pins 44.

When a metal sheet E has been located on the second side of the table against the edge of the metal sheet D, the operator inflates the second side clamp air bag 120 and deflates the second side unclamp air bag 118. The plate 114 of the second clamp unit C will thus be pivoted in order to apply the springs 130 against the metal sheet E, thereby clamping same against the base A.

With the first and second side clamp air bags 80 and 20 inflated, the welding sequence can commence once the operator so selects. During the welding sequence, the X-table moves the base A, as well as the first and second clamp units B and C and hence the two metal sheets D and E, under the laser beam so as to weld the two sheets D and E to each other. Upon reaching a preset table position, the X-table motion will stop and the laser will be de-energized. Thereafter, the frame clamp cylinders 142 will be de-energized. Then the first side and second side clamp air bags 80 and 120 will be deflated and the first side and second side unclamp air bags 78 and 118 will be inflated in order to pivot the springs 90 and 130 away from the subjacent metal sheets D and E. At this point, the now welded sheets D and E can be removed from the clamp fixture.

The invention has been described with reference to a preferred embodiment. Obviously, modifications and alterations will occur to others upon the reading and understanding of the preceding specification. It is intended that the invention be construed as including all such alterations and modifications insofar as they come within the scope of the appended claims or the equivalents thereof.

We claim:

1. A clamping device for butt-welding material sheets together comprising:
   a base for supporting adjoining edges of a first and a second associated sheet of material;
   a first clamping unit positioned above said base, said first clamping unit comprising:
      a plurality of first springs spaced from each other, each first spring having a first end, for independently contacting the associated first sheet, and a second end, and
      a first support linkage including a pivoting member to which said second ends of each of said plurality of first springs is secured, for selectively applying a force by said plurality of first springs in a downward and inward direction to the associated first sheet;
   a second clamping unit, positioned above said base and spaced from said first clamping unit, said second clamping unit comprising:

a plurality of second springs longitudinally spaced from each other, each second spring having a first end, for independently contacting the associated second sheet, and a second end, and a second support linkage including a pivoting member to which said second ends of each of said plurality of second springs is secured, for selectively applying a force by said plurality of second springs in a downward and inward direction to the associated second sheet.

2. The device of claim 1 wherein said first ends of each of said plurality of first and second springs includes a contact tip.

3. The device of claim 1 wherein said plurality of first and second springs are curvilinearly shaped such that each of them can apply a combination downward and inward force to the associated first and second sheets.

4. The device of claim 1 wherein said base comprises a plurality of longitudinally spaced locating pins which, when in a raised position, are used for indexing an edge of the associated first sheet.

5. The device of claim 4 wherein said base further comprises a plurality of longitudinally spaced cylinders, said pins each being secured to a piston rod end of a respective cylinder.

6. The device of claim 4 wherein said base further comprises a shutter plate which selectively extends over a tip of each locating pin when said plurality of locating pins is in a lowered position.

7. The device of claim 6 wherein said shutter plate is coupled to a shutter moving mechanism comprising:

a cylinder to which one end of said shutter plate is secured; and, a spring to which another end of said shutter plate is secured.

8. The device of claim 1 wherein said base comprises:

a frame;

a plurality of first longitudinally spaced metal bars secured to a first side of said frame for supporting the associated first sheet; and, a plurality of second longitudinally spaced metal bars secured to a second side of said frame for supporting the associated second sheet.

9. The device of claim 1 wherein said first support linkage comprises:

a first member fixedly secured in relation to said base;

the pivoting member, spaced from said first member, to which said second ends of said plurality of first springs are secured;

a hinge located between said first member and said pivoting member, and secured thereto, for pivotally mounting said pivoting member to said first member;

a first selectively pressurizable bag located between said first member and said pivoting member on one side of said hinge; and, a second selectively pressurizable bag located between said first member and said pivoting member on another side of said hinge, wherein an inflation of said first bag causes said pivoting member to pivot in relation to said first member to bring said first ends of said first springs into contact with the associated first sheet and an inflation of said second bag causes said pivoting member to pivot in relation to said first member to space said first ends of said plurality of first springs away from the associated first sheet.

10. A clamping device for butt-welding metal sheets, comprising:

a base for supporting adjacent edges of a pair of associated metal sheets;

a first clamping unit positioned above said base, said first clamping unit comprising:

a first spring having a first end, for selectively contacting a first metal sheet, and a second end, a first support linkage to which said spring is secured, said support linkage comprising:

a first member fixedly secured in relation to said base, a second member to which said spring second end is secured, a hinge located between said first and second members, and secured thereto, for pivotally mounting said second member to said first member, a first selectively pressurizable bag located between said first and second members on one side of said hinge, and a second selectively pressurizable bag located between said first and second members on another side of said hinge, wherein an inflation of said first bag causes said second member to pivot in relation to said first member to bring said spring first end into contact with the associated first metal sheet and an inflation of said second bag causes said second member to pivot in relation to said first member to space said spring first end away from the associated first metal sheet; and, a second clamping unit positioned above said base in spaced relation to said first clamping unit, said second clamping unit comprising:

a second spring having a first end, for selectively contacting a second associated metal sheet, and a second end, a second support linkage to which said spring is secured, said support linkage comprising:

a first member fixedly secured in relation to said base, a second member to which said spring second end is secured, a hinge located between said first and second members, and secured thereto, for pivotally mounting said second member to said first member, a first selectively pressurizable bag located between said first and second members on one side of said hinge, and a second selectively pressurizable bag located between said first and second members on another side of said hinge, wherein an inflation of said first bag causes said second member to pivot in relation to said first member to bring said spring first end into contact with the associated second metal sheet and an inflation of said second bag causes said second member to pivot in relation to said first member to space said spring first end away from the associated second metal sheet.

11. The device of claim 10 wherein said second member is planar and said first member comprises a substantially U-shaped channel.

12. The device of claim 10 wherein a plurality of spaced first and second springs are secured to said respective first and second clamping units.

13. The device of claim 10 wherein said spring first end includes a tip of non-scratching material.

14. The device of claim 10 wherein said first and second springs are somewhat S-shaped so that they apply a combination downward and inward force on the associated metal sheets.

15. The device of claim 10 further comprising:

a first support member, secured to said base, for supporting said first support linkage; and, a first clamping arm for selectively clamping said first support member to prevent a deformation thereof when said first and second pressurizable bags are inflated.

16. A clamping device for securing a pair of sheets of material for welding along a linear butt joint formed therebetween, the device comprising:

a base for supporting adjacent edges of a first and a second associated sheet of material;

a first clamping unit positioned above said base, said first clamping unit comprising:

a plurality of first springs spaced from each other, each first spring having a first end, for independently contacting the associated first sheet, and a second end, a first pivoting support linkage means, to which said second ends of each of said plurality of first springs are secured, and a first pneumatic means for selectively applying a pivoting force to said first linkage means to urge said plurality of first springs into contact with the associated first sheet;

a second clamping unit, positioned above said base and spaced from said first clamping unit, said second clamping unit comprising:

a plurality of second springs longitudinally spaced from each other, each second spring having a first end, for independently contacting the associated second sheet, and a second end, a second pivoting support linkage means, to which said second ends of said second springs are secured, and a second pneumatic means for selectively applying a pivoting force to said second linkage means to urge said plurality of second springs into contact with the associated second sheet;

a pneumatic pressure source for supplying pneumatic pressure to said first and second pneumatic means; and, a control means for regulating the flow of pneumatic pressure from said pneumatic pressure source to said first and second pneumatic means.

17. The device of claim 16 wherein said first support linkage comprises;

a first member fixedly secured in relation to said base, a second member to which said spring second end is secured, and a hinge located between said first and second members, and secured thereto, for pivotally mounting said second member to said first member.

18. The device of claim 17 wherein said first pneumatic means comprises:

a first selectively pressurizable bag located between said first and second members on one side of said hinge, and a second selectively pressurizable bag located between said first and second members on another side of said hinge, wherein an inflation of said first bag causes said second member to pivot in relation to said first member to bring said spring first end into contact with the associated first sheet and an inflation of said second bag causes said second member to pivot in relation to said first member to space said spring first end away from the associated first sheet.

19. The device of claim 1 wherein said base comprises:

a plurality of longitudinally spaced locating pins, which when in a raised position, are used for indexing an edge of the associated first sheet; and, a plurality of longitudinally spaced cylinders, said pins each being secured to a piston rod end of a respective cylinder.

20. The device of claim 19 wherein said base further comprises a shutter plate which selectively extends over a tip of each locating pin when said plurality of locating pins is in a lowered position.

21. The device of claim 1 wherein said plurality of first and second springs are somewhat S-shaped to apply a combination downward and inward force on the associated metal sheets.

22. The device of claim 1 further comprising:.

a first support member, secured to said base, for supporting said first clamping unit; and a first clamping arm for selectively clamping said first support member to prevent a deformation thereof when said first and second pressurizable bags are inflated.

23. The device of claim 1 further comprising a limiting member limiting the pivoting of the pivoting member in an unclamping direction.

24. The device of claim 16 wherein said plurality of first and second springs are somewhat S-shaped to apply a combination downward and inward force on the associated metal sheets.

* * * * *